US009077883B2

(12) United States Patent
Kawai

(10) Patent No.: US 9,077,883 B2
(45) Date of Patent: Jul. 7, 2015

(54) INFORMATION PROCESSING APPARATUS WITH VIBRATION DETECTION, CONTROL METHOD THEREFOR, AND RECORDING MEDIUM

(75) Inventor: Yuji Kawai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 881 days.

(21) Appl. No.: 13/021,363

(22) Filed: Feb. 4, 2011

(65) Prior Publication Data

US 2011/0199529 A1 Aug. 18, 2011

(30) Foreign Application Priority Data

Feb. 15, 2010 (JP) ................................. 2010-029668
Nov. 11, 2010 (JP) ................................. 2010-253205

(51) Int. Cl.
*H04N 5/232* (2006.01)
*G06F 1/16* (2006.01)

(52) U.S. Cl.
CPC .............. *H04N 5/232* (2013.01); *G06F 1/1626* (2013.01); *G06F 2200/1636* (2013.01)

(58) Field of Classification Search
CPC .................................................... H04N 5/2254
USPC .......................................................... 348/335
See application file for complete search history.

(56) References Cited

U.S. PATENT DOCUMENTS

| 2003/0142081 | A1* | 7/2003 | Iizuka et al. | 345/173 |
| 2004/0008210 | A1* | 1/2004 | Ikehata | 345/619 |
| 2006/0028446 | A1 | 2/2006 | Liberty et al. | |
| 2008/0044171 | A1* | 2/2008 | Hyatt | 396/79 |
| 2009/0284463 | A1* | 11/2009 | Morimoto et al. | 345/156 |
| 2010/0033428 | A1* | 2/2010 | Ahn et al. | 345/157 |
| 2010/0214211 | A1* | 8/2010 | Dods et al. | 345/156 |
| 2010/0232704 | A1* | 9/2010 | Thorn | 382/195 |
| 2010/0321312 | A1 | 12/2010 | Han et al. | |

FOREIGN PATENT DOCUMENTS

| JP | 06-004208 | 1/1997 |
| JP | 2007-535774 A | 12/2007 |
| JP | 2009-258372 A | 11/2009 |
| JP | 2009-302808 | 12/2009 |

OTHER PUBLICATIONS

European Search Report issued on May 13, 2011 that issued in the corresponding European Patent Application No. 11153837.8.
Aug. 5, 2014 Japanese Office Action that issued in Japanese Patent Application No. 2010-253205.

* cited by examiner

*Primary Examiner* — Roberto Velez
*Assistant Examiner* — Cynthia Segura
(74) *Attorney, Agent, or Firm* — Cowan, Liebowitz & Latman, P.C.

(57) ABSTRACT

An information processing apparatus prevents the physical switch operation from being wrongly detected as the tapping operation to thereby cause the intended process to be surely performed. The information processing apparatus has an operation member. The vibration of the information processing apparatus is detected and an operation of the operation member is detected. If the operation of the operation member is not detected by the member operation detecting unit within a predetermined period after the vibration detecting unit has been detected the vibration, a function assigned to the detected vibration is executed, and if the operation of the operation member is detected by the member operation detecting unit within the predetermined period after the vibration detecting unit has detected the vibration, a function corresponding to the operation of the operation member without executing the function assigned to the detected vibration is executed.

10 Claims, 10 Drawing Sheets

FIG.5

| OPERATION SECTION | VIBRATION (ACCELERATION) CHARACTERISTICS |
|---|---|
| ZOOM LEVER | $-100<x<100, -10<y<10, -10<z<10$ |
| MODEL LEVER | $-100<x<100, -10<y<10, -10<z<10$ |
| MENU BUTTON | $-10<x<10, -10<y<10, -30<z<30$ |
| DIAL | $-40<x<40, -40<y<40, -10<z<10$ |

INFORMATION PROCESSING APPARATUS WITH VIBRATION DETECTION, CONTROL METHOD THEREFOR, AND RECORDING MEDIUM

BACKGROUND OF THE INVENTION

1. Field of the Invention

The present invention relates to an information processing apparatus, a control method therefore, and a recording medium, and more particularly, to an information processing apparatus on which a tapping operation and a physical switch operation can be performed, a control method therefor, and a recording medium.

2. Description of the Related Art

There has been conventionally proposed an information processing apparatus which performs, when detecting an acceleration waveform of a predetermined pattern using an acceleration sensor, a process assigned to the predetermined pattern. For example, in Japanese Laid-Open Patent Publication (Kokai) No. 2009-302808, there is described a digital camera for which a user can set each function by performing a tapping operation of tapping a surface of a housing of a digital camera with a fingertip without operating a physical switch. In Japanese Laid-Open Patent Publication (Kokai) No. H06-004208, there is described an information processing apparatus which detects and analyzes the movement, rotation or the like of a body of an information processing apparatus caused when operated by one hand, by an acceleration sensor, and outputs an instruction for image information.

However, there may be a case where the acceleration waveform of the vibration generated at the time of operating the physical switch resembles the waveform of the vibration generated at the time of performing the tapping operation very much. In such a case, it may happen that the physical switch operation is wrongly detected as the tapping operation, which may cause a process different from an intended process to be unfavorably performed.

SUMMARY OF THE INVENTION

The present invention provides an information processing apparatus which is capable of preventing the physical switch operation from being wrongly detected as the tapping operation to thereby cause the intended process to be surely performed, a control method therefor, and a recording medium.

In an aspect of the present invention, there is provided an information processing apparatus having an operation member, the information processing apparatus comprising: a vibration detecting unit configured to detect the vibration of the information processing apparatus; a member operation detecting unit configured to detect an operation of the operation member; and an execution unit configured to execute, if the operation of the operation member is not detected by the member operation detecting unit within a predetermined period after the vibration detecting unit has been detected the vibration, a function assigned to the detected vibration, and to execute, if the operation of the operation member is detected by the member operation detecting unit within the predetermined period after the vibration detecting unit has detected the vibration, a function corresponding to the operation of the operation member without executing the function assigned to the detected vibration.

According to the present invention, it is possible to prevent the physical switch operation from being wrongly detected as the tapping operation to thereby cause the intended process to be surely performed.

Further features and advantages of the present invention will become apparent from the following detailed description of exemplary embodiments with reference to the attached drawings.

BRIEF DESCRIPTION OF THE DRAWINGS

FIG. 5 is a table which is useful in explaining vibration (acceleration) characteristics related to operated physical switches stored in a non-volatile memory 102 in FIG. 2, which is used for determination of step S306 in FIG. 4.

DETAILED DESCRIPTION OF THE PREFERRED EMBODIMENTS

The present invention will now be described in detail with reference to the accompanying drawings showing preferred embodiments thereof.

Figure 1:
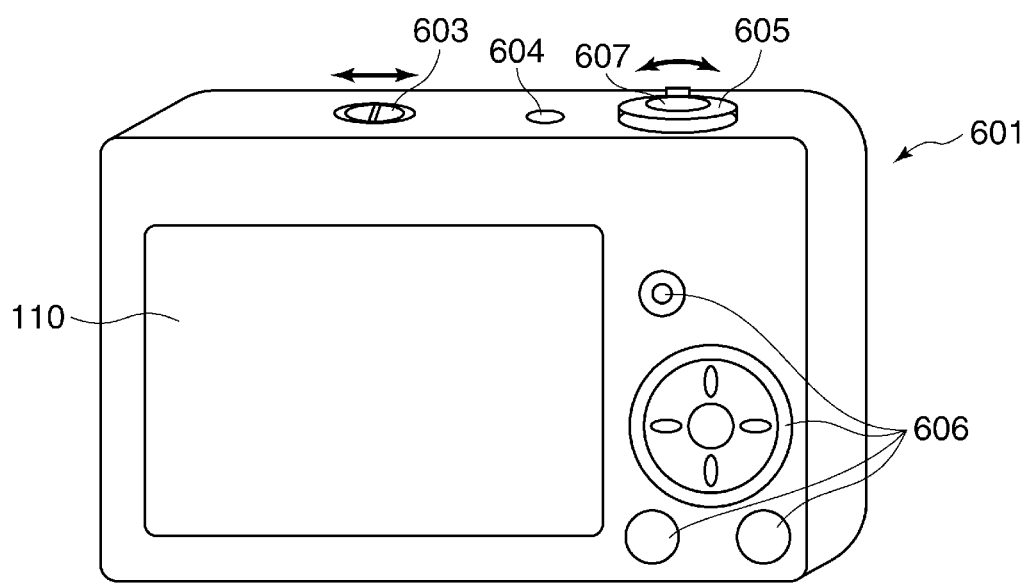
FIG. 1 is an external perspective view of an information processing apparatus according to a first embodiment of the present invention, showing a case in which the information processing apparatus is viewed from the back.

FIG. 1 is an external perspective view of an information processing apparatus according to a first embodiment of the present invention, showing a case in which the information processing apparatus is viewed from the back.

The information processing apparatus according to the first embodiment of the present invention is configured, for example, by a general personal computer (PC), which is preferably portable. In this embodiment, the information processing apparatus is configured by a digital camera 601.

In FIG. 1, the digital camera 601 has on its back a display 110 in FIG. 2, described later, which is for displaying images and various pieces of information, and has on its top a mode lever 603 for switching a photographing mode, a power switch 604 for turning on/off power, a zoom lever 605 for adjusting zooming of a zoom lens included in photographing lenses and adjusting the enlargement ratio at the time of electronically zooming a displayed image in a reproduction mode or the like, and a shutter button 607 for issuing a photographing instruction. The digital camera 601 further has other operation members 606 such as various switches, buttons, a touch panel and the like for accepting various operations from a user. The mode lever 603, the power switch 604, the zoom lever 605, the other operation members 606 and the shutter button 607 constitute an operation section 105 in FIG. 2, described later.

Figure 2:
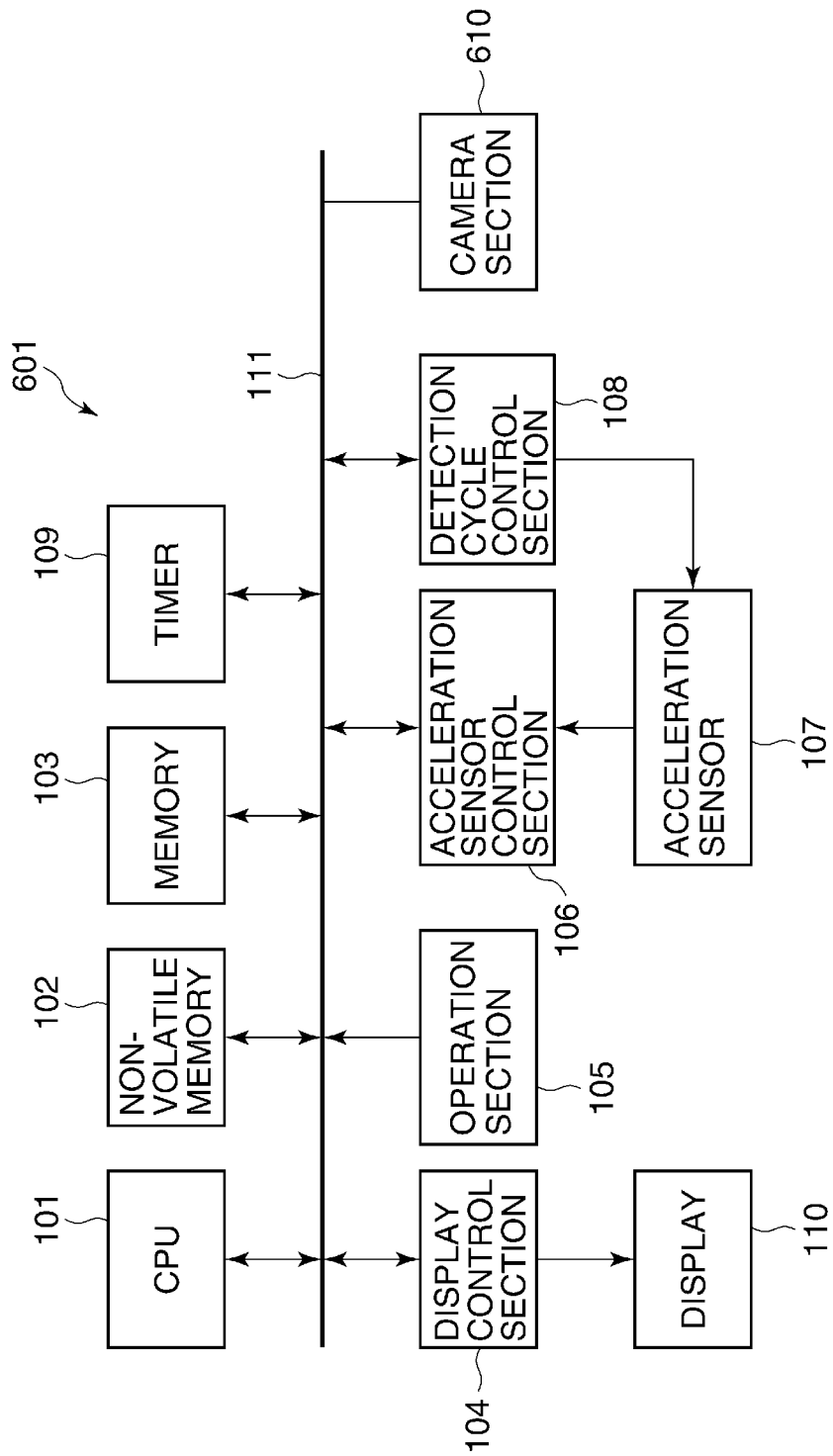
FIG. 2 is a block diagram schematically showing the internal configuration of a digital camera 601 of FIG. 1.

FIG. 2 is a block diagram schematically showing the internal configuration of the digital camera 601 in FIG. 1.

In FIG. 2, the digital camera 601 has a CPU 101, a non-volatile memory 102, a memory 103, a display control section 104, an operation section 105, an acceleration sensor control section 106, a detection cycle control section 108, a timer 109, and a camera section (including a zoom lens which is a photographing lens) 610. These are connected to one another via a internal bus 111 and can transmit and receive data to and from one another via the internal bus 111. An acceleration sensor 107 is connected to the detection cycle control section 108 at an input thereof and is connected to the acceleration sensor control section 106 at an output thereof. To the display control section 104 is connected a display 110.

The non-volatile memory 102 stores image data, other data, various programs for the CPU 101 to operate, and the like. The memory 103 comprises a RAM, for example. The CPU 101 controls each section of the information processing apparatus 100 using the memory 103 as a work memory in accordance with a control program stored in the non-volatile memory 102, for example.

The operation section 105 accepts a user operation, generates a control signal corresponding to the user operation, and provides the control signal to the CPU 101. For example, the operation section 105 is constituted by a character information input device such as a keyboard, a pointing device such as a mouse and a touch panel, physical switches such as a mode lever, a zoom lever, a menu button, and a dial, and the like, as an input device for accepting the user operation. The touch panel outputs coordinate information corresponding to a position at which a user's finger touches on a planarly configured input section, for example. The CPU 101 controls each section of the information processing apparatus 100 on the basis of a control signal generated by the operation section 105 in response to a user operation performed on the input device. Thereby, it is possible to cause the information processing apparatus 100 to perform an operation corresponding to the user operation.

The CPU 101 provides a display control signal to the display control section 104. The display control section 104 generates a display signal for causing the display 110 to display an image and outputs the display signal to the display 110, on the basis of the display control signal. For example, the display control section 104 causes the display 110 to display a GUI screen constituting a GUI (Graphical User Interface) on the basis of the display control signal generated by the CPU 101.

In a case where the operation section 105 comprises a touch panel, the operation section 105 and the display 110 can be configured as one unit. For example, the touch panel can be attached on the display surface of the display 110 while being constituted as to prevent the light transmittance from deteriorating the display capability of the display 110. Input coordinates on the touch panel and display coordinates on the display 110 are associated with each other. This enables to configure such a GUI as to appear as if a user could directly operate a screen displayed on the display 110.

The acceleration sensor 107 detects vibration (acceleration) given along each of the X-axis direction, the Y-axis direction, and the Z-axis direction of the information processing apparatus 100 for each cycle generated by the detection cycle control section 108 and outputs acceleration data. It should be noted that various sensors, such as an angular rate sensor and a gyroscope, may be used in addition to the acceleration sensor.

The acceleration sensor control section 106 acquires the acceleration data output from the acceleration sensor 107 for each cycle generated by the detection cycle control section 108. The non-volatile memory 102 stores multiple acceleration patterns corresponding to various vibration operations including a tapping operation, described later, or the characteristics of the patterns. The acceleration sensor control section 106 determines which of the acceleration patterns in the non-volatile memory 102 is matched by the acceleration data from the acceleration sensor 107. The acceleration patterns include, for example, an acceleration pattern at the time of tapping a body of the information processing apparatus 100 from its back, an acceleration pattern at the time of tapping the body from its side, an acceleration pattern at the time of shaking the body up and down twice continuously, and the like. If the acceleration data from the acceleration sensor 107 matches any one of the acceleration patterns, the CPU 101 executes a process assigned to the matched acceleration pattern.

For example, if the acceleration data matches the acceleration pattern at the time of tapping the digital camera 601 from its back, an image displayed on the display 110 is enlarged. If the acceleration data matches the acceleration pattern at the time of tapping the digital camera 601 from its side, the image feeding is executed while the image displayed on the display 110 being switched to another image. If the acceleration data matches the acceleration pattern at the time of shaking the digital camera 601 up and down twice continuously, the operation mode of the information processing apparatus 100 is switched. If the acceleration data does not match any one of the acceleration pattern or characteristics, nothing is done. It should be noted that an operation of lightly tapping the information processing apparatus 100 is referred to as a "tapping operation", which will be described below as the example of an operation performed on the basis of the acceleration data detected by the acceleration sensor 107.

The timer 109 is used for measurement of a sampling cycle or a certain predetermined time, for example, a process examination period, described later, and the like of the physical switch of the digital camera 601.

Figure 3:
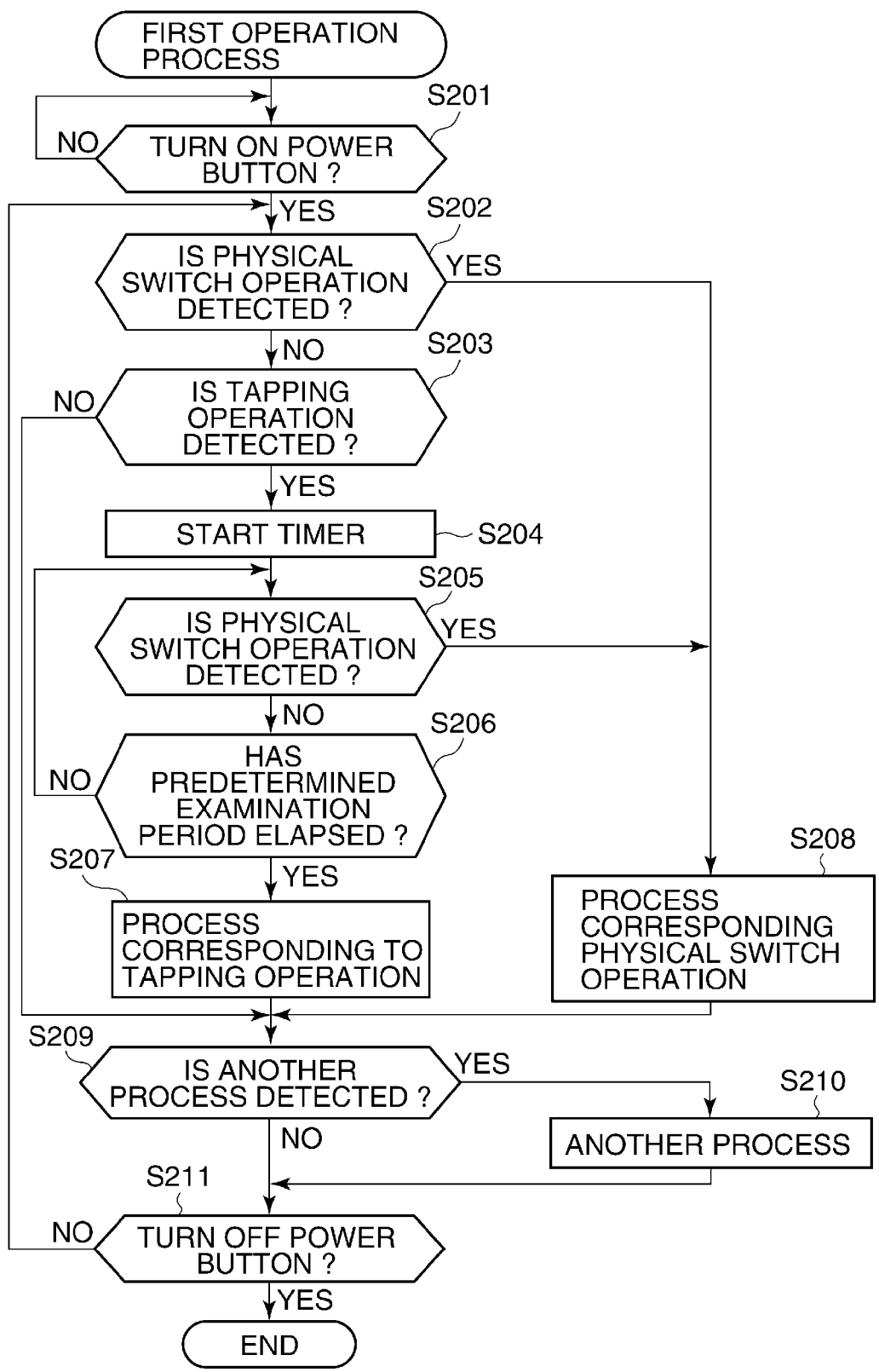
FIG. 3 is a flowchart showing the procedure of a first operation process executed by the digital camera 601 of FIG. 1.

FIG. 3 is a flowchart showing the procedure of a first operation process executed by the digital camera 601 of FIG. 1.

This process is for detecting input of the physical switch within a predetermined time period after having detected a predetermined-pattern acceleration waveform of the tapping operation, which enables to prevent the physical switch operation from being wrongly detected as the tapping operation to thereby cause the intended process to be surely performed.

This process is executed by the CPU 101 which executes a program stored in the non-volatile memory 102 with the program developed on the work memory 103.

In FIG. 3, when a user turns on the power switch 604 of the digital camera 601 first (YES to step S201), it is determined whether or not the physical switch operation on the operation section 105 by the user is detected (step S202). Here, the user's operation of the physical switch may be detected by detecting that a corresponding port of the physical switch has dropped or by detecting that the physical switch has been pressed down with chattering of the physical switch eliminated.

As a result of the determination of the step S202, if the physical switch operation is detected, control corresponding to the physical switch operation is performed on the basis of a control signal generated by the operation section 105 corresponding to the physical switch operation (step S208), and subsequently the process proceeds to step S209.

As a result of the determination of the step S202, if the physical switch operation is not detected, it is determined by the acceleration sensor control section 106 whether or not the tapping operation is detected, depending on whether the acceleration data of the acceleration sensor 107 matches an acceleration pattern or its characteristics stored in the non-volatile memory 102 (step S203), whereas if the tapping operation is detected, the acceleration sensor control section 106 causes the timer 109 to start timing of a process examination time period (step S204). In the step S204, it is also possible to cause the timer 109 to start timing of the process examination time when the acceleration data of the acceleration sensor 107 exceeds a predetermined threshold after having started detection of the vibration at the time of detecting the tapping operation in step S203.

In the following step S205, it is determined whether or not the physical switch operation of the operation section 105 is detected. Here, the user's operation of the physical switch may be detected by detecting that a corresponding port of the physical switch has dropped or by detecting that the physical switch has been pressed down with chattering of the physical switch switched.

As a result of the determination of the step S205, if the physical switch operation is detected, control corresponding to the physical switch operation is performed on the basis of a control signal corresponding to the physical switch operation generated by the operation section 105 (step S208), and subsequently the process proceeds to step S209.

As a result of the determination of the step S205, if the physical switch operation is not detected, the determination of the step S205 is repeated until the process examination period elapses (times out) with the timer 109 referred to (NO to step S206). When the process examination time elapses (YES to the step S206), a process assigned to the tapping operation (for example, image feeding) is performed (step S207), and subsequently the process proceeds to step S209.

The determination of the step S205 may be performed depending on whether or not the physical switch operation is detected within the process examination period after the acceleration pattern of the tapping operation has been detected.

In the following step S209, it is determined whether or not any other operation is detected. Then, it is determined whether or not the user has turned off power (step S211), immediately if the any other operation is not detected, or after the CPU 101 performs another process (step S210) if the any other operation is detected.

As a result of the determination of the step S211, if the power is not turned off, the processes in and after the step S202 are repeated, whereas if the power is turned off, this process is immediately terminated.

According to the process of FIG. 3, if the tapping operation is detected (YES to the step S203) before the physical switch operation is detected within the process examination period (YES to the step S205), the process corresponding to the physical switch operation is performed (step S208), which enables to prevent the physical switch operation from being wrongly detected as the tapping operation to thereby cause the intended process to be surely performed.

Figure 4:
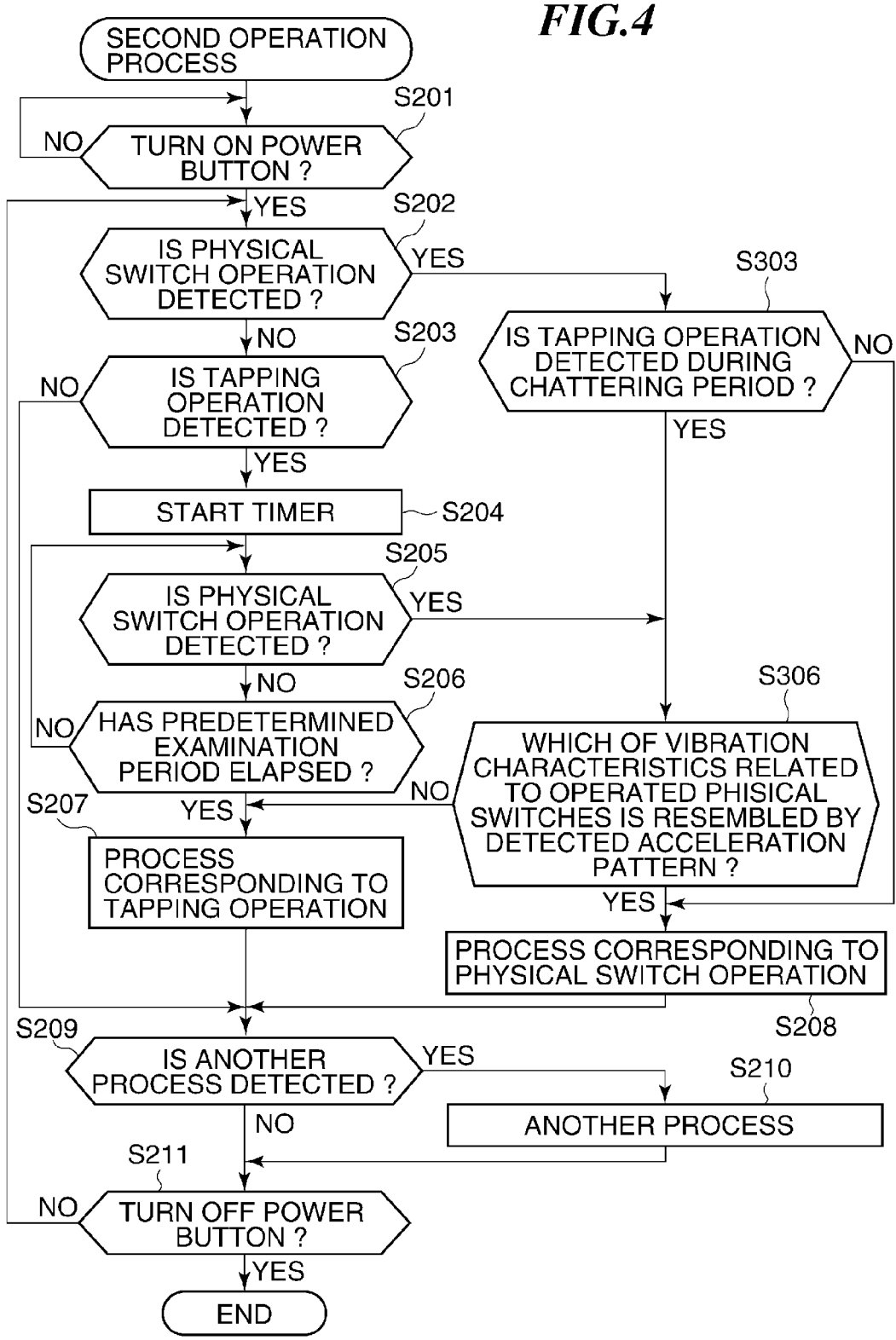
FIG. 4 is a flowchart showing the procedure of a second operation process executed by the digital camera 601 of FIG. 1.

FIG. 4 is a flowchart showing the procedure of a second operation process executed by the digital camera 601 of FIG. 1.

This process is for executing, even if the physical switch is wrongly pressed down when the tapping operation is to be performed, a process corresponding to the tapping operation and by executing, even if the tapping operation is detected during a period of the physical switch chattering, a process corresponding to the operation of the physical switch, which enables to prevent the physical switch operation from being wrongly detected as the tapping operation to thereby cause the intended process to be surely performed.

This process is executed by the CPU 101 which executes a program stored in the non-volatile memory 102 with the program developed on the work memory 103.

The flowchart of FIG. 4 is basically the same as that of FIG. 3. In the flowchart of FIG. 4, the same processing as in the flowchart of FIG. 3 is given the same step number. In the descriptions below, only the points different from the flowchart of FIG. 3 will be described.

In FIG. 4, as a result of the determination of the step S202, if the physical switch operation is detected, it is determined by the acceleration sensor control section 106 whether or not the tapping operation is detected during a period of the physical switch chattering (step S303).

If the tapping operation is detected during the period of the physical switch chattering as a result of the determination of the step S303, or if the physical switch operation is detected (YES to the step S205) before a predetermined examination time elapses (NO to the step S206) after the tapping operation has been detected (YES to the step S203), it is determined which of the vibration (acceleration) characteristics related to the operated physical switches stored in the non-volatile memory 102 (FIG. 5) is resembled by an acceleration pattern detected by the acceleration sensor control section 106 (step S306).

In FIG. 5, the physical switches of the digital camera 601 are assumed to include a mode lever, a zoom lever, a menu button and a dial. FIG. 5 shows that the vibration (acceleration) characteristics in each of the X-axis direction, the Y-axis direction, and the Z-axis direction generated when each of the physical switches is operated, which is stored in the non-volatile memory 102.

Returning to FIG. 4, as a result of the determination of the step S306, if the acceleration pattern detected by the acceleration sensor control section 106 resembles any one of the vibration (acceleration) characteristics related to the operated physical switches stored in the non-volatile memory 102, control corresponding to the physical switch operation is performed on the basis of the control signal generated by the operation section 105 corresponding to the physical switch operation (step S208) before the processes in and after step S209 are executed, and subsequently the process terminates.

As a result of the determination of the step S303, if the tapping operation is not detected during the period of the physical switch chattering, the processes in and after the step S208 are executed without the determination of the step S306 executed, and subsequently the process terminates.

As a result of the determination of the step S306, if the acceleration pattern detected by the acceleration sensor control section 106 does not resemble any one of the acceleration characteristics about operated physical switches stored in the non-volatile memory 102, a process corresponding to the tapping operation is executed (step S207) before the processes in and after step S209 are executed, and subsequently the process terminates.

According to the process of FIG. 4, in a case where the physical switch operation is detected (YES to the step S202) and then the tapping operation is detected during the period of the physical operation chattering (YES to the step S303), if the acceleration pattern detected by the acceleration sensor control section 106 resembles any one of the acceleration characteristics related to the operated physical switches stored in the non-volatile memory 102 (YES to the step S306), then the process corresponding to the physical switch operation is executed (step S208), whereas if the acceleration pattern detected by the acceleration sensor control section 106 does not resemble any one of the acceleration characteristics related to the operated physical switches stored in the non-volatile memory 102 (NO to the step S306), the process corresponding to the tapping operation is executed (step S207). Therefore, it is possible to execute, even if the physical switch is wrongly pressed when the tapping operation is to be performed, the process corresponding to the tapping operation, and to execute, even if the tapping operation is detected during the period of a physical switch chattering, the process corresponding to the physical switch operation, which enables to prevent the physical switch operation from being wrongly detected as the tapping operation to thereby cause the intended process to be surely performed.

Figure 6:
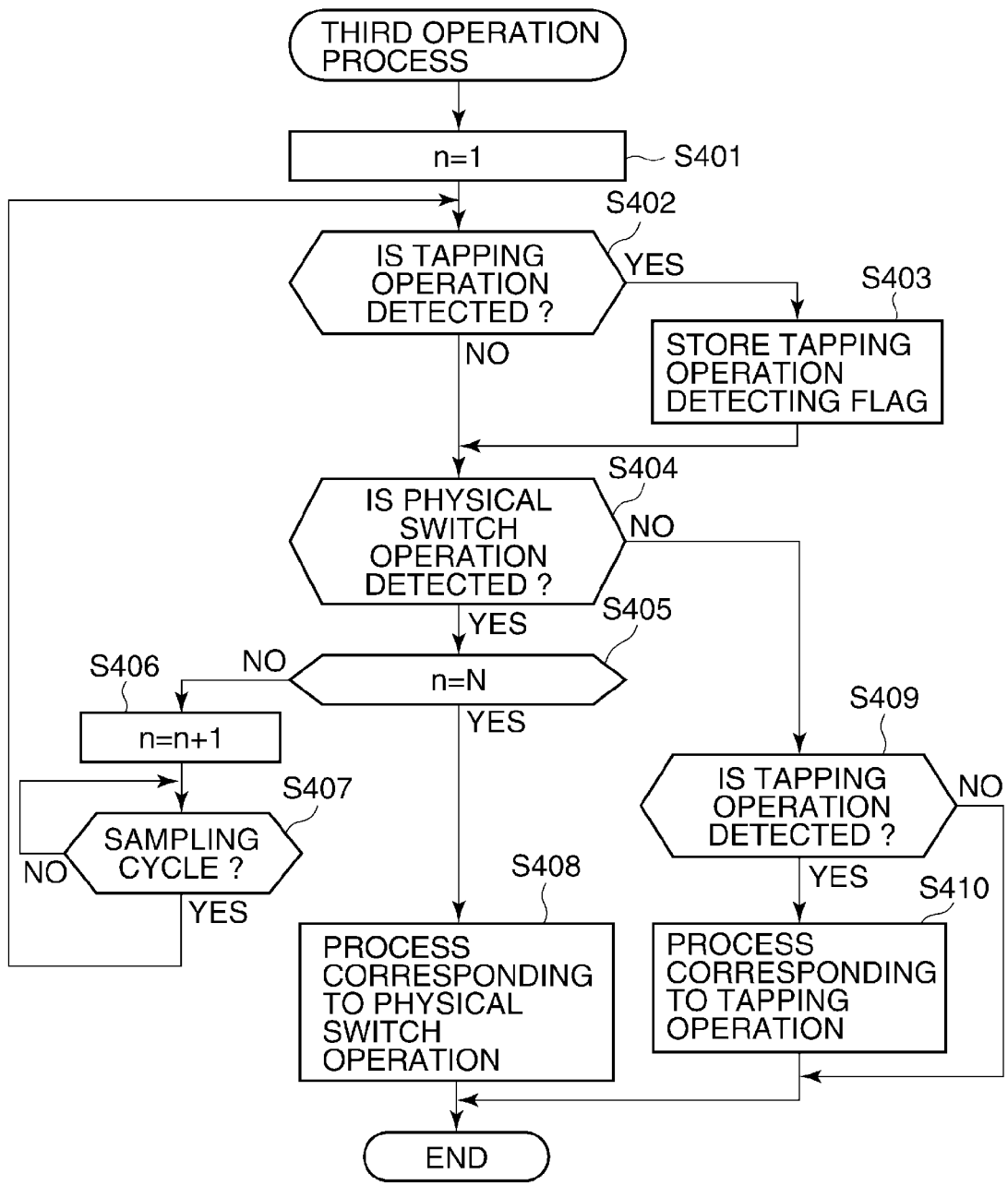
FIG. 6 is a flowchart showing the procedure of a third operation process executed by the digital camera 601 of FIG. 1.

FIG. 6 is a flowchart showing the procedure of a third operation process executed by the digital camera 601 of FIG. 1.

This process is for performing, when the physical switch operation is detected within a predetermined time after the tapping operation is performed, a process corresponding to the physical switch operation without performing a process corresponding to the tapping operation, which enables to prevent the physical switch operation from being wrongly detected as the tapping operation to thereby cause the intended process to be surely performed.

This process is executed by the CPU 101 which executes a program stored in the non-volatile memory 102 with the program developed on the work memory 103.

In FIG. 6, a variable n prepared in the memory 103 is first set to "1" (step S401), before it is determined by the acceleration sensor control section 106 whether or not the tapping operation is detected, by comparing acceleration data detected by the acceleration sensor 107 with a tapping operation acceleration pattern in the non-volatile memory 102 (step S402).

As a result of the determination of the step S402, it is determined whether or not the physical switch of the operation section 105 is turned on (step S404), immediately if the tapping operation is not detected, or after a tapping operation detecting flag indicating detection of the tapping operation has been stored into the memory 103 (step S403) if the tapping operation is detected.

As a result of the determination of the step S404, if the physical switch is tuned on, it is determined whether or not the variable n in the memory 103 is equal to a constant N (step S405). Then, the sampling cycle is waited to repeat N times (steps S406 to S407) with the physical switch turned on (YES to the step S404), in order to eliminate chattering of the physical switch (YES to the step S405), which provides the determination of the physical switch having been pressed, and substantially a process corresponding to the physical switch operation is executed (step S408), and subsequently the process terminates. The processes from steps S404 to S407 enable to eliminate chattering of the physical switch.

As a result of the determination of the step S404 (NO to the step S404), if the physical switch is turned off, it is determined whether or not the tapping operation has already been detected in the step S402 with reference to the tapping operation detecting flag stored in the step S403 (step S409), and subsequently the process terminates, immediately if the tapping operation has not been detected in the step S402, or a process corresponding to the tapping operation is executed (step S410) if the tapping operation has been detected in the step S402.

According to the process in FIG. 6, it is possible to perform, when the physical switch operation is detected within a predetermined time after the tapping operation has been detected (YES to the step S405), a process corresponding to the physical switch operation without a process corresponding to the tapping operation (step S408), which enables to prevent the physical switch operation from being wrongly detected as the tapping operation to thereby cause the intended process to be surely performed.

The operation process described above is on the assumption of using both of the tapping operation and the physical switch operation; however, the present invention can be extended to a case in which both of a plurality of tapping operations and a plurality of physical switch operations are used. Moreover, although the tapping operation and the physical switch operation cannot be strictly acquired at the same time because of the processing capability of the CPU 101, the CPU 101 can be estimated to acquire both the operations substantially at the same time.

That is, the first operation process (FIG. 3) is changed as set forth below.

It is determined whether or not the physical switch operation has been detected substantially at the same time with the vibration (acceleration) detected as a trigger. If the physical switch operation has been detected, a process corresponding to the physical switch operation is executed, whereas if the physical switch operation has not been detected, a tapping operation corresponding to the detected vibration (acceleration) is determined, and subsequently a process corresponding to the determined tapping operation is executed.

The second operation process (FIG. 4) is changed as set forth below.

In a case where the vibration (acceleration) is detected for the physical switch operation, and if the vibration matches the characteristics of the vibration of the detected physical switch operation, a process corresponding to the physical switch operation is executed with the vibration ignored. In a case where the physical switch operation is detected substantially at the same time with the vibration detected as a trigger, and if the vibration matches the characteristics of the vibration of the detected physical switch operation, a process corresponding to the physical switch operation is executed with the vibration ignored. If the detected vibration does not match the characteristics of the vibration of the detected physical switch operation, a tapping operation corresponding to the detected vibration is determined, and subsequently a process to the determined tapping operation is executed.

A description will now be made, with reference to FIGS. 7 to 10, of a process for monitoring the port status of the physical switch for each tap operation detecting cycle and providing a period of the tapping operation canceling, which enables to prevent the physical switch operation from being wrongly detected as the tapping operation to thereby cause the intended process to be surely performed.

Figure 7:
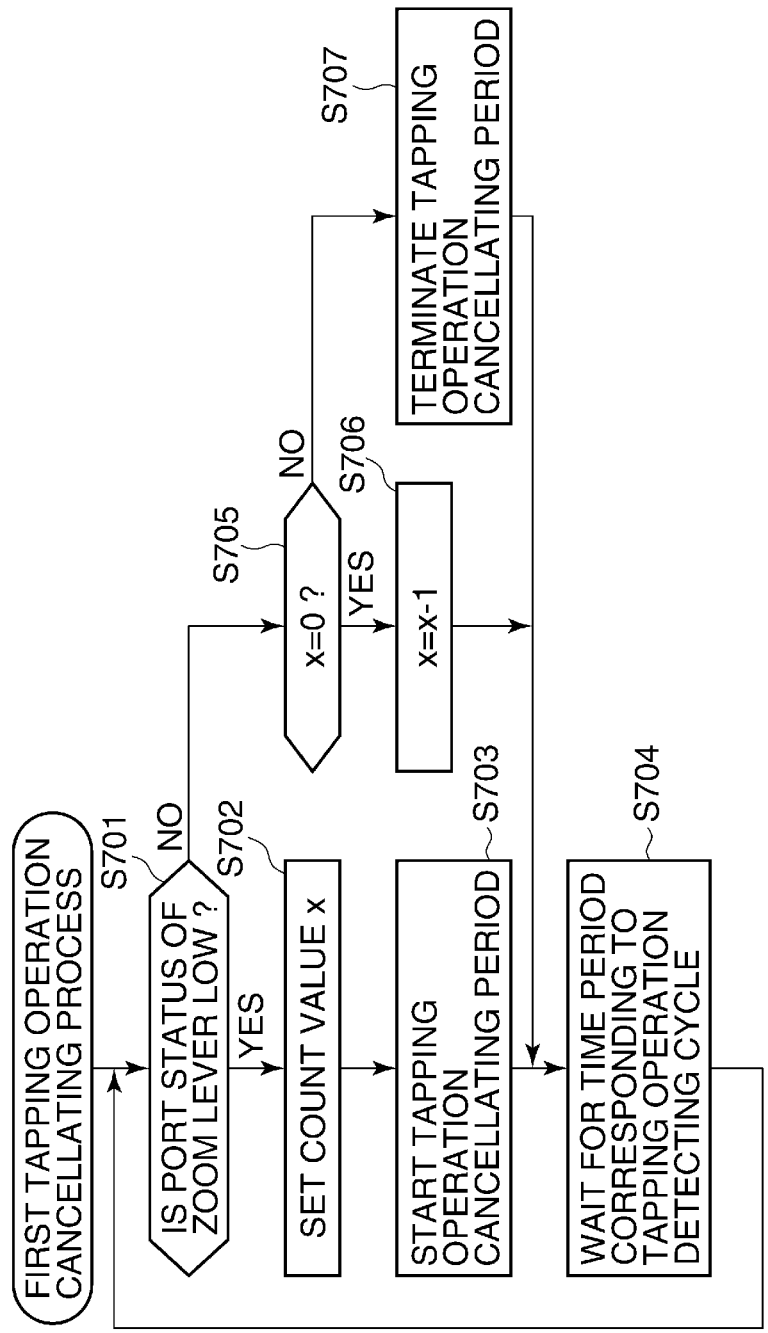
FIG. 7 is a flowchart showing the procedure of a first tapping operation cancelling process executed by the digital camera 601 of FIG. 1.

FIG. 7 is a flowchart showing the procedure of a first tapping operation cancelling process executed by the digital camera 601 of FIG. 1.

This process includes using a zoom lever for adjusting zooming of a photographing lens (zoom lens) as an example of the physical switch. Here, the zoom lever is assigned different ports depending on whether tele-direction or the wide-direction is selected, that is, it is assumed that the operation of the lever is effective (pressed-down state) when the port status is "Low", and that the operation of the lever is ineffective (released state) when the port status is "High". Moreover, the tapping operation cancelling period is defined as a period of preventing, even if the acceleration sensor control section 106 detects the tapping operation, an operation corresponding thereto from being performed.

This process is executed by the CPU 101 which executes a program stored in the non-volatile memory 102 with the program developed on the work memory 103.

In FIG. 7, it is first determined whether or not the port status of the zoom lever is "Low", that is, the zoom lever is pressed down, in order to confirm the tele-direction side port status and the wide-direction port side status of the zoom lever (step S701).

As a result of the determination of the step S701, if the port status of the zoom lever is "Low", a count value x prepared in the memory 103 is set to a value to be described later (step S702), the tapping operation cancelling period is started by enabling the tapping operation cancelling flag indicating that the tapping operation is to be cancelled (step S703), and then, a time period corresponding to one tapping operation detecting cycle is waited for (step S704), and subsequently the processes in and after step S701 are repeated.

Here, the count value x is set to a value indicating how long the tapping operation cancelling period is to be continued after the zoom lever is in the High status, that is, after the zoom lever has been released. "After the zoom lever has been released" means "after the operation of the zoom lever has completed". The time period for continuing the tapping operation cancelling period is assumed to be obtained by multiplying the tapping operation detecting cycle by the count value x. Setting the time period for continuing the tapping operation cancelling period enables to prevent the tapping operation from being misdetected due to the reaction caused when the zoom lever is released.

As a result of the determination of step S701, if the port status is not "Low" but "High", that is, the zoom lever is not pressed down, it is determined whether or not the count value x prepared in the memory 103 is "0". If the count value x is "0", the count value x in the memory 103 is decremented (step S706). If the count value x is not "0", the tapping operation cancelling flag is disabled to terminate the tapping operation cancelling period (step S707), and subsequently the processes in and after step S704 are repeated.

According to the process in FIG. 7, it is possible to prevent the zoom lever operation from being wrongly detected as the tapping operation to thereby cause the intended process to be surely performed. The operation of this process will now be described in detail with reference to FIG. 8.

Figure 8:
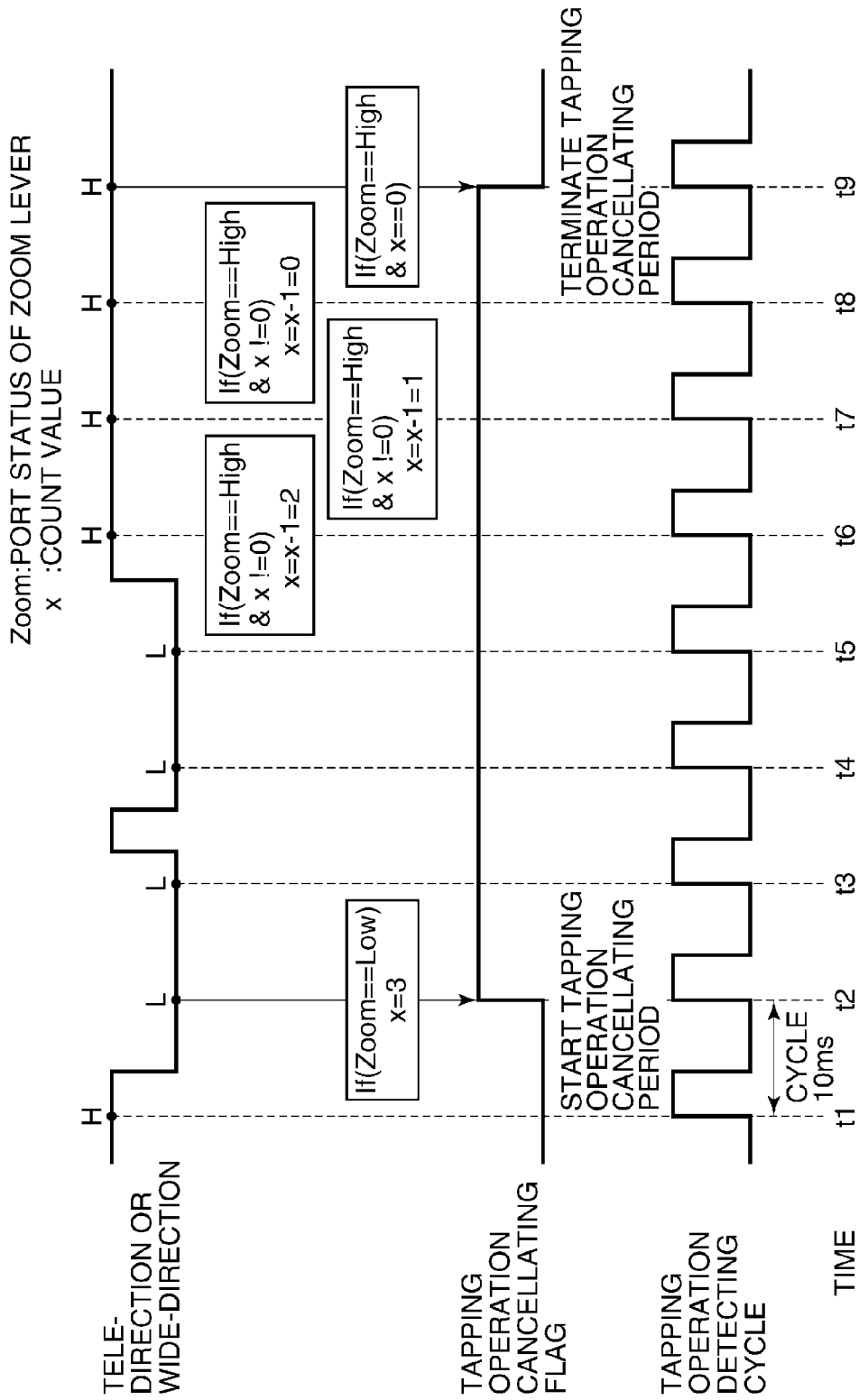
FIG. 8 is a timing chart which is useful in explaining the relation between the port status of a zoom lever for each tapping operation detecting cycle and the state of a tapping operation cancelling flag.

FIG. 8 is a timing chart which is useful in explaining the relation between the port status of the zoom lever for each tapping operation detecting cycle and the state of the tapping operation cancelling flag.

In FIG. 8, the port statuses of the zoom lever (the tele-direction and the wide-direction) are acquired for each tapping operation detecting cycle of 10 ms. It is determined first at time t2 that the port status of the zoom lever in the tele-direction or the wide-direction is "Low" (the zoom lever is pressed down), and the count value x is set to "3". That is, the port statues of the zoom lever changes to "High" (the zoom lever is released) before the time for continuing the tapping operation cancelling period is set to 30 ms (tapping operation detecting cycle 10 ms×count value 3). Then, the tapping operation cancelling flag is enabled to start the tapping operation cancelling period.

Then, the port status is acquired for each tapping operation detecting cycle. When the port status changes to "High" (the zoom lever is released) at time t6, the count value is decremented to "2" because the count value is not "0" then. As far as the port status continues to be "High" (the zoom lever is not pressed down), decrement of the count value x is continued. When the count value x becomes "0" (at time t9), the tapping operation cancelling flag is disabled to terminate the tapping operation cancelling period.

Figure 9:
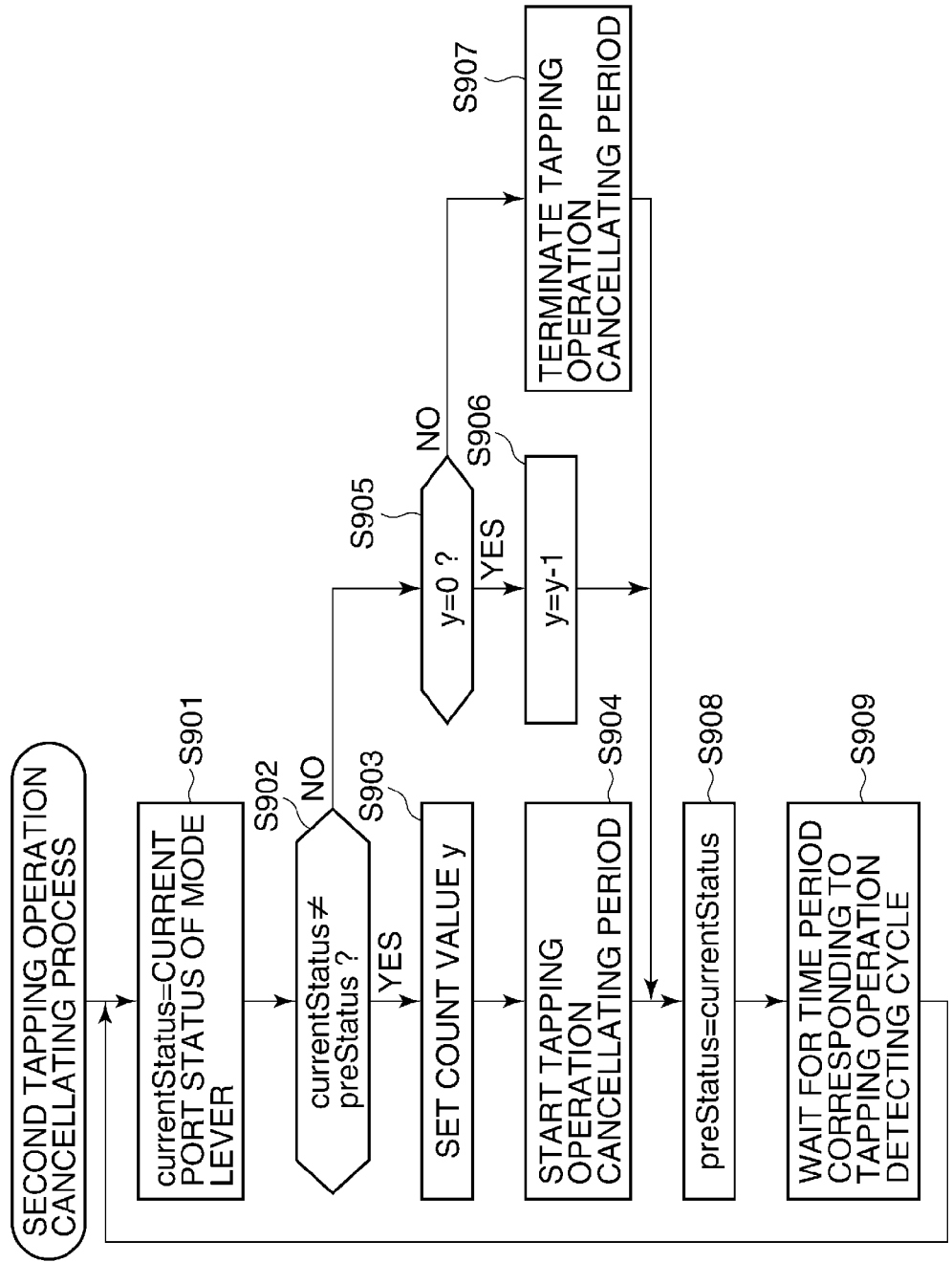
FIG. 9 is a flowchart showing the procedure of a second tapping operation cancelling process executed by the digital camera 601 of FIG. 1.

FIG. 9 is a flowchart showing the procedure of a second tapping operation cancelling process executed by the digital camera 601 of FIG. 1.

This process includes using a mode lever for changing the photographing mode is used as an example of a physical switch. Here, the mode lever has one port assigned thereto. For example, an auto-photographing mode is assigned when the status is "High", and a manual photographing mode is assigned when the status is "Low". That is, the mode lever is not in a pressed-down state or a released state unlike the zoom lever but is assumed to be always in either of the modes.

This process is executed by the CPU 101 which executes a program stored in the non-volatile memory 102 with the program developed on the work memory 103.

In FIG. 9, an acquired current port status of the mode lever is stored in a variable currentStatus prepared in the memory 103 (step S901), and it is determined whether or not the current port status currentStatus is different from a variable preStatus indicating the port status of the mode lever acquired when the tapping operation is just previously detected, which is stored in the memory 103 (step S902).

As a result of the determination of the step S902, if the current port status currentStatus is different from the variable preStatus, a count value y prepared in the memory 103 is set to a value to be described later (step S903), the tapping operation cancelling flag indicating that the tapping operation is to be canceled is enabled to start the tapping operation cancelling period (step S904), and the variable currentStatus indicating the current port status is substituted for the variable preStatus, indicating the port status of the mode lever acquired when the tapping operation is detected, which is prepared in the memory 103 (step S908), and then a time period corresponding to one tapping operation detecting cycle is waited for (step S909), and subsequently the processes in and after step S901 are repeated.

Here, the value set for the count value y is a value indicating how long the tapping operation cancelling period is to be continued when the same port status continues after the port status of the mode lever having changed.

As a result of the determination of the step S902, if the current port status currentStatus is the same as the variable preStatus, it is determined whether or not the count value y prepared in the memory 103 is "0" (step S905). If the count value y is "0", the count value y in the memory 103 is decremented (step S906), whereas if the count value y is not "0", the tapping operation cancelling flag is disabled to terminate the tapping cancellation period (step S907), and subsequently the processes in and after step S901 are repeated.

According to the process in FIG. 9, it is possible to prevent the mode lever operation from being wrongly detected as the tapping operation to thereby cause the intended process to be surely performed. The operation of this process will now be described in detail with reference to FIG. 10.

Figure 10:
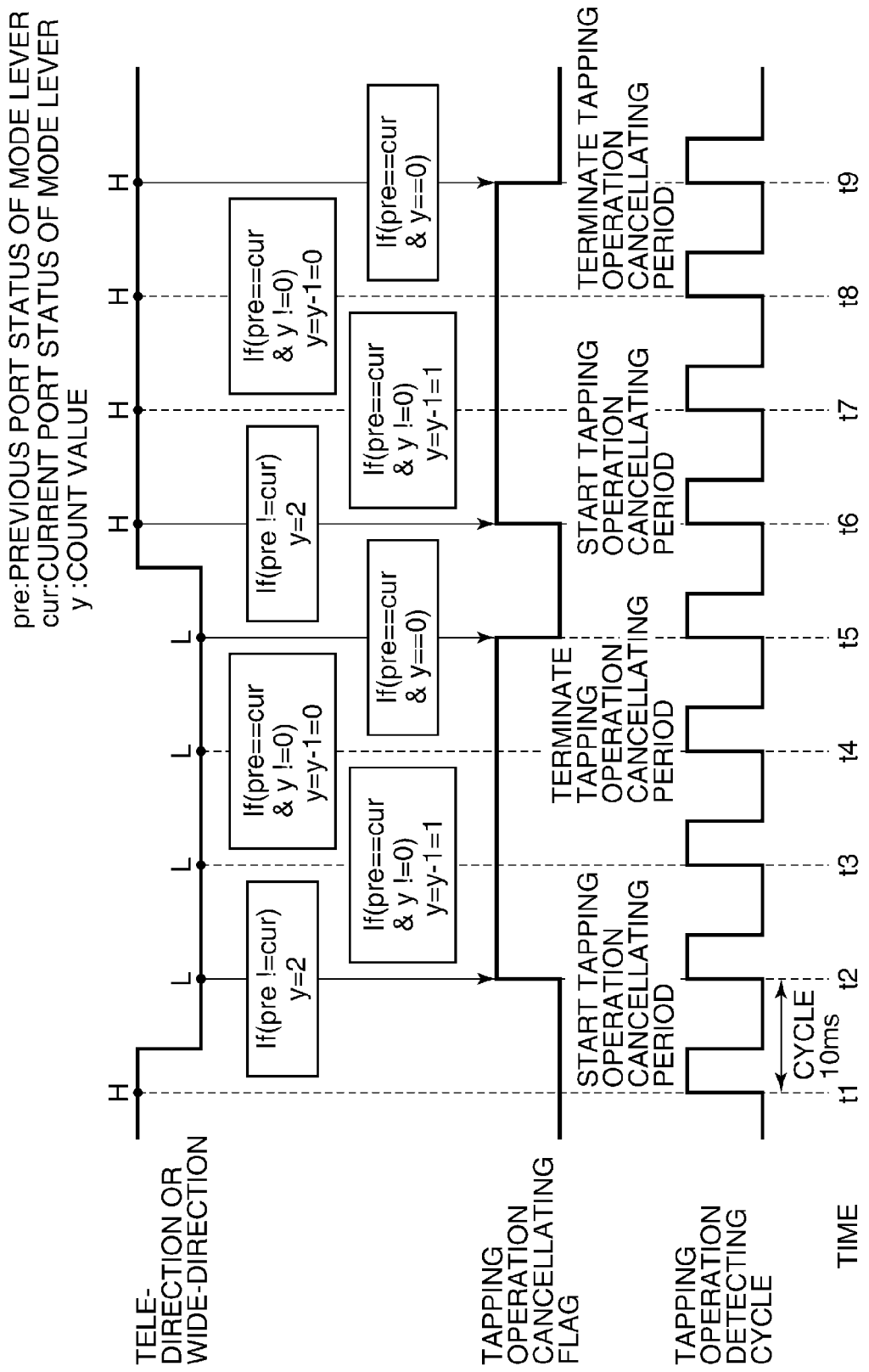
FIG. 10 is a timing chart which is useful in explaining the relation between the port status of a mode lever for each tapping operation detecting cycle and the state of the tapping operation cancelling flag.

FIG. 10 is a timing chart which is useful in explaining the relation between the port status of the mode lever for each tapping operation detecting cycle and the state of the tapping operation cancelling flag.

In FIG. 10, the port status of the mode lever is acquired for each tapping operation detecting cycle of 10 ms. If it is first determined at time t1 that the port status of the mode lever is "High" (the auto photographing mode status), and it is determined at the time of next detecting the tapping operation (time t2) that the port status is "Low" (the manual photographing mode status), the count value y is set to "2" because the current port status is different from the previous port status. That is, if the same port status continues after the port status of the mode lever changes from the auto photographing mode to the manual photographing mode or from the manual photographing mode to the auto photographing mode, the time for continuing the tapping operation cancelling period is set to 30 ms (tapping operation detecting cycle 10 ms+tapping operation detecting cycle 10 ms×count value 2). Then, the tapping operation cancelling flag is enabled to start the tapping operation cancelling period.

Next, the port status for each tapping operation detecting cycle is acquired. When the port status is the same as the previous port status at time t3, the count value y is decremented to "1" because the count value is not "0". As far as the port status continues the same as the previous port status, decrement of the count value y is continued. When the count value y becomes "0" (at time t5), the tapping operation cancelling flag is disabled to terminate the tapping operation cancelling period.

Thus, according to the tapping operation cancelling process described above, it is possible to prevent wrong actuation of the tapping operation from being caused by the zoom lever operation or the mode lever operation, by monitoring the port status (operation state) assigned to the zoom lever and the mode lever, and providing, when the port status changes, the tapping operation cancelling period so that, even if the tapping operation is detected during the tapping operation cancelling period, an operation corresponding to the tapping operation is not performed.

The above-stated tapping operation cancelling process has been described with a digital camera as an example of the information processing apparatus and a zoom lever and a mode lever as examples of the physical switch. However, the tapping operation cancelling process can be adapted to other information processing apparatuses and physical switches. Furthermore, not only with regard to the physical switch, such as a zoom lever and a mode lever, but also with regard to an HDMI cable or a USB cable, it is possible to prevent wrong actuation of the tapping operation from being caused by pulling out or inserting the cable by monitoring the port assigned to a relevant connector and setting a tapping operation cancelling period at the time of pulling out or inserting the cable.

In the tapping operation cancelling process described above, an example of canceling the tapping operation for a predetermined period after the operation status of the operation member changes, but the tapping operation cancelling process is not limited thereto. A similar effect can be also obtained by performing control so that the tapping operation is not detected by the acceleration sensor control section 106, for example, by stopping power supply to the acceleration sensor 107 for a predetermined period after the operation status of the operation member changes.

Furthermore, since it is possible to perform control suitable for each of physical switches which are different in operation method from one another, the tapping operation cancelling process is more effective to prevent wrong actuation of the tapping operation in comparison with the first to third operation processes described above. For example, by setting a count value determining the time for continuing the tapping operation cancelling period to an optimum value for each physical switch, it is possible to prevent wrong actuation of the tapping operation, non-operation of the tapping operation in spite of the tapping operation having been performed, and the like.

Furthermore, the tapping operation cancelling process described above is an algorithm of monitoring the port of the physical switch and then determining whether or not to cancel the tapping operation depending on the port status, which facilitates designing and implementation of the process in comparison with the first to third operation processes described above.

The present invention is not limited to equipment for a particular purpose but is generally applicable to equipment using both of an operation by a physical switch and an operation by vibration. Such equipment includes a PDA (personal digital assistance), a digital camera, a digital video camera, a mobile phone terminal, a mobile image viewer, a printer, a digital photo frame, a music player, a game machine, and the like. As for control by the CPU 101, the control may be performed by one piece of hardware as described above, or multiple pieces of hardware may share processes to control the whole apparatus.

It should be noted that, as for the processes of the embodiments described above, a computer-readable recording medium in which a program code of software realizing each function is recorded may be provided for a system or an apparatus. Then, by a computer (or CPU or MPU) of the system or apparatus reading out and executing the program code stored in the storage medium, the functions of the embodiments described above can be realized. In this case, the program code itself read from the storage medium realizes the functions of any of the embodiments described above, and hence the program code and the storage medium in which the program code is stored constitute the present invention. Examples of the recording medium for supplying such a program code include, for example, a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program may be downloaded via a network.

Further, it is to be understood that the functions of the above described embodiments may be accomplished not only by executing a program code read out by a computer, but also by causing an OS (operating system) or the like which operates on the computer to perform a part or all of the actual operations based on instructions of the program code.

Further, it is to be understood that the functions of the above described embodiments may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2010-029668, filed Feb. 15, 2010, and Japanese Application No. 2010-253205, filed Nov. 11, 2010, which are hereby incorporated by reference herein in its entirety.

What is claimed is:

1. An information processing apparatus having an operation member comprising at least one of a physical switch, a lever, and a button, the information processing apparatus comprising:

a vibration detector configured to detect vibration of the information processing apparatus;

a member operation detector configured to detect an operation of the operation member; and a processor configured to execute, after a delay period after the vibration detector has detected the vibration has expired and operation of the operation member during said delay period has not been detected, a function assigned to the detected vibration, and to execute, if the operation of the operation member is detected by the member operation detector within said delay period, a function corresponding to the operation of the operation member without executing the function assigned to the detected vibration.

2. The information processing apparatus according to claim 1, wherein the vibration detector includes an acceleration sensor.

3. An information processing apparatus having an operation member comprising at least one of a physical switch, a lever, and a button, and a memory configured to store the characteristics of vibration caused by the operation of the operation member, the information processing apparatus comprising:

a vibration detector configured to detect vibration of the information processing apparatus;

a member operation detector configured to detect an operation of the operation member; and a processor configured to, if the operation of the operation member is detected by the member operation detector within a delay period after the vibration detector has detected the vibration, execute a function corresponding to the operation of the operation member when the detected vibration resembles the characteristics of the vibration caused by the operation of the operation member stored in the memory and execute a function assigned to the detected vibration when the detected vibration does not resemble the characteristics.

4. An information processing apparatus having an operation member comprising at least one of a physical switch, a lever, and a button, and a memory configured to store the characteristics of the vibration caused by an operation of the operation member, the information processing apparatus comprising:

a vibration detector configured to detect the vibration of the information processing apparatus;

a member operation detector configured to detect an operation of the operation member; and a processor configured to, if the operation of the operation member is detected by the member operation detector within a delay period after the vibration detector has detected the vibration or if the vibration is detected by the vibration detector during a period of the operation member chattering caused by the operation of the operation member, execute a function corresponding to the operation of the operation member when the detected vibration resembles the characteristics of the vibration caused by the operation of the operation member stored in the memory and execute a function assigned to the detected vibration when the detected vibration does not resemble the characteristics.

5. An information processing method for an information processing apparatus having an operation member comprising at least one of a physical switch, a lever, and a button, the information processing method comprising:

a vibration detecting step of detecting vibration of the information processing apparatus;

a member operation detecting step of detecting an operation of the operation member; and an execution step of executing, after a delay period after the vibration has been detected in the vibration detecting step has expired and operation of the operation member during said delay period has not been detected in said member operation detecting step, a function assigned to the detected vibration, and executing, if the operation of the operation member is detected in the member operation detecting step within said delay period after vibration has been detected in the vibration detecting step, a function corresponding to the operation of the operation member without executing the function assigned to the detected vibration.

6. An information processing method for an information processing apparatus having an operation member comprising at least one of a physical switch, a lever, and a button, and a memory configured to store the characteristics of the vibration caused by the operation of the operation member, the information processing method comprising:

a vibration detecting step of detecting vibration of the information processing apparatus;

a member operation detecting step of detecting an operation of the operation member; and an execution step of, if the operation of the operation member is detected in the member operation detecting step within a delay period after the vibration has been detected in the vibration detecting step, executing a function corresponding to the operation of the operation member when the detected vibration resembles the characteristics of the vibration caused by the operation of the operation member stored in the memory and executing a function assigned to the detected vibration when the detected vibration does not resemble the characteristics.

7. An information processing method for an information processing apparatus having an operation member comprising at least one of a physical switch, a lever, and a button, and a memory configured to store the characteristics of vibration caused by the operation of the operation member, the information processing method comprising:

a vibration detecting step of detecting vibration of the information processing apparatus;

a member operation detecting step of detecting an operation of the operation member; and an execution step of, if the operation of the operation member is detected in the member operation detecting step within a delay period after the vibration has been detected in the vibration detecting step or if the vibration is detected in the vibration detecting step during a period of the operation member chattering caused by the operation of the operation member, executing a function corresponding to the operation of the operation member when the detected vibration resembles the characteristics of the vibration caused by the operation of the operation member stored in the memory and executing a function assigned to the detected vibration when the detected vibration does not resemble the characteristics.

8. A non-transitory computer-readable storage medium storing a program for causing a computer to implement an information processing method for an information processing apparatus having an operation member comprising at least one of a physical switch, a lever, and a button, the information processing method comprising:

a vibration detecting step of detecting vibration of the information processing apparatus;

a member operation detecting step of detecting an operation of the operation member; and an execution step of executing, after a delay period after the vibration has been detected in the vibration detecting step has expired and operation of the operation member during said delay period has not been detected in said member operation detecting step, a function assigned to the detected vibration, and executing, if the operation of the operation member is detected in the member operation detecting step within said delay period after vibration has been detected in the vibration detecting step, a function corresponding to the operation of the operation member without executing the function assigned to the detected vibration.

9. A non-transitory computer-readable storage medium storing a program for causing a computer to implement an information processing method for an information processing apparatus having an operation member comprising at least one of a physical switch, a lever, and a button, the information processing method comprising:
- a vibration detecting step of detecting vibration of the information processing apparatus;
- a member operation detecting step of detecting an operation of the operation member;
- a storing step of storing the characteristics of the vibration caused by the operation of the operation member; and
- an execution step of, if the operation of the operation member is detected in the member operation detecting step within a delay period after the vibration has been detected in the vibration detecting step, executing a function corresponding to the operation of the operation member when the detected vibration resembles the characteristics of the vibration of the operation of the operation member stored in the storing step and executing a function assigned to the detected vibration when the detected vibration does not resemble the characteristics.

10. A non-transitory computer-readable storage medium storing a program for causing a computer to implement an information processing method for an information processing apparatus having an operation member comprising at least one of a physical switch, a lever, and a button, the information processing method comprising:
- a vibration detecting step of detecting vibration of the information processing apparatus;
- a storing step of storing the characteristics of the vibration caused by an operation of the operation member;
- a member operation detecting step of detecting an operation of the operation member; and
- an execution step of, if the operation of the operation member is detected in the member operation detecting step within a delay period after the vibration has been detected in the vibration detecting step or if the vibration is detected in the vibration detecting step during a period of the operation member chattering caused by the operation of the operation member, executing a function corresponding to the operation of the operation member when the detected vibration resembles the characteristics of the vibration of the operation of the operation member stored in the storing step and executing a function assigned to the detected vibration when the detected vibration does not resemble the characteristics.

* * * * *